Sept. 26, 1950 J. C. AKESTER ET AL 2,523,933
VENTILATING SYSTEM
Filed Oct. 10, 1945 2 Sheets-Sheet 2

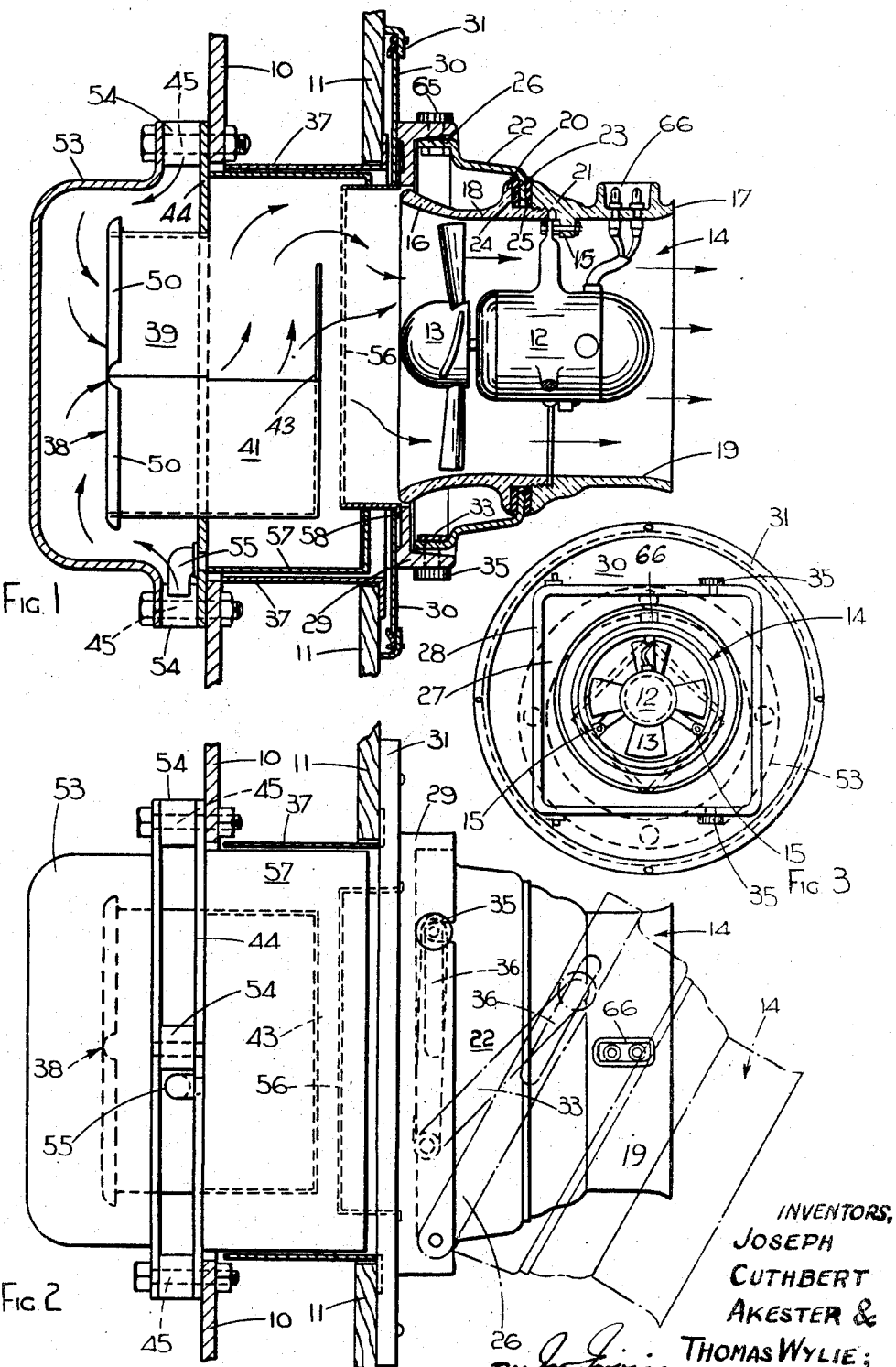

INVENTORS,
JOSEPH CUTHBERT AKESTER
& THOMAS WYLIE;

BY [signature]

ATTORNEY.

Patented Sept. 26, 1950

2,523,933

UNITED STATES PATENT OFFICE 2,523,933

VENTILATING SYSTEM

Joseph Cuthbert Akester, Haywards Heath, and Thomas Wylie, Twickenham, England, assignors to Axia Fans Limited, London, England, a corporation of Great Britain Application October 10, 1945, Serial No. 621,534
In Great Britain October 18, 1944

6 Claims. (Cl. 98—38)

1

This invention relates to ventilating systems and it has for an object to provide an improved ventilating system more particularly for ships operating in tropical waters where it is essential to maintain adequate ventilation by day and night.

It is a further object of the invention to simplify ship ventilation by providing individual ventilating systems instead of centralised ventilation.

According to the invention a ventilating system for a ship's cabin or other compartment, comprises a rotary fan and supporting means therefor arranged so that the fan can be turned to face in any desired direction.

According to one form of the invention there is provided a ventilating system for a ship's cabin or other compartment, comprising a ventilating fan, an air duct within which said fan is rotatably mounted, and means for supporting said duct including a pair of members hinged together, one of which carries the air duct while the other is mounted for rotation, so that the fan can be turned to face in any desired direction.

According to another form of the invention there is provided a ventilating system for a ship's cabin or other compartment, comprising a ventilating fan, an air duct within which said fan is rotatably mounted, and means for supporting said duct including a part-spherical member which carries the air duct therein, and a part-spherical socket within which the said member can be turned in any desired direction.

The air duct may be supported adjacent an air inlet opening (in the cabin wall) of an air inlet passage so as to be adjustable relative thereto, and means may be provided in the air inlet passage for preventing the access of water from outside the cabin through said passage to the fan. These means may include a weather-proof cowl mounted on the outside of the ship's hull, and a baffle device disposed in said air inlet passage.

One construction of baffle device according to the invention comprises a hollow member of square cross section which is normally disposed with its longitudinal axis horizontal and one of the diagonals of its cross section vertical, the said member having adjacent front parts of its upper surfaces cut away and being provided with a substantially square baffle plate at its front end.

The invention is illustrated by way of example in the accompanying drawings, in which:

Figure 1 is a sectional side view of one construction of ventilating system for a ship's cabin

2 including supporting means for the fan and duct and a baffle device in the inlet passage;

Figure 2 is a plan view of the construction shown in Figure 1;

Figure 3 is an end view corresponding with Figures 1 and 2 on a reduced scale, as seen from within the cabin;

Figures 4, 5:
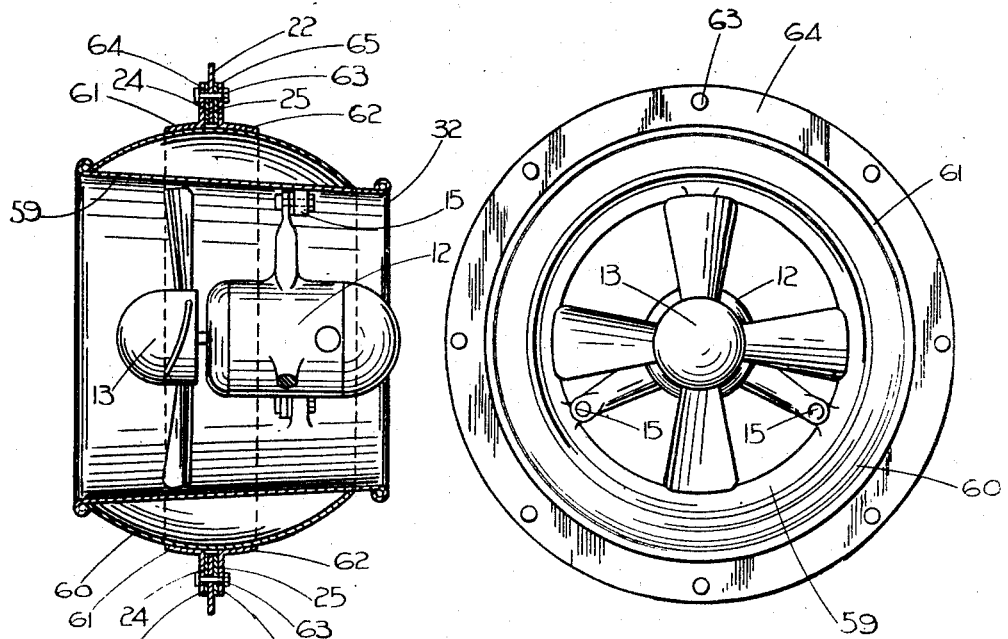
Figure 4 is a sectional side view of an alternative construction of ventilating system according to the invention.
Figure 5 is an end view of the construction shown in Figure 4 as seen from the left thereof.

In Figures 1 to 3, the ventilating system is shown as applied to a ship having a hull or deckhouse 10 and a cabin wall or lining 11 spaced apart parallel to one another. An electric motor 12, for rotating within an air duct generally indicated at 14 a rotary ventilating fan 13 preferably made of moulded synthetic resin, is supported in known manner at three points 15 within said duct, and is connected through a cable socket 66 to a source of electricity.

The air duct 14 is disposed adjacent an air inlet passage, the flanged casing 37 of which is secured to the cabin lining 11 and extends between said lining and the ship's hull 10. The duct 14 is substantially tubular in shape flaring outwardly at the ends 16 and 17, and comprises two flanged parts 18 and 19 adapted to be screwed together so that the flanges 20 and 21 form a peripheral groove round the duct. The duct is supported by a frame 22 of synthetic resin or other material surrounding the rear part 18 of the duct and having an inwardly directed annular flange 23 at its front end adapted to be clamped in the above mentioned groove between a pair of annular rubber washers 24, 25, for reducing or preventing vibration.

The rear end 26 of the frame 22 is substantially square in cross section and is hinged along one edge 27 to a flange 28 on one side of a square frame 29 surrounding the square end 26 of the frame 22 and coaxial therewith.

The second frame 29, which may also be made of synthetic resin or other material, is secured by nuts and bolts (not shown), or otherwise, to an annular plate 30 which is mounted for rotation in its own plane with its periphery within a fixed circular guide 31 surrounding the air inlet opening in the cabin lining 11, so that the frames 22 and 29, and consequently the disposition of the hinge therebetween may be angularly adjusted about the axis of the duct 14. If desired the rear end 26 of the frame 22 may be circular instead of square in cross section and the frame 29 to which it is hinged may be correspondingly or otherwise suitably shaped.

Thus it will be seen that with the above construction the duct and fan are mounted adjacent the air inlet opening in the cabin wall so as to be able to face in any desired direction into the cabin.

When the air duct 14 has been turned by means of the hinge between the frames 22 and 29, it may be supported and/or locked in its adjusted position by means of links 33 pivotally connected at one end to the top and bottom flanges respectively of the frame 29 and at the other end to the square rear end 26 of the frame 22, bolts 35 cooperating with slots 36 in the said end 26 of the frame 22.

To prevent the access of water to the fan from the outside of the cabin, and at the same time prevent the passage of light outwards from the cabin through the air inlet passage, means are provided including a weatherproof cowl 53 mounted on the outside of the ship's hull 10 and a baffle device disposed in the said passage.

Figure 6:
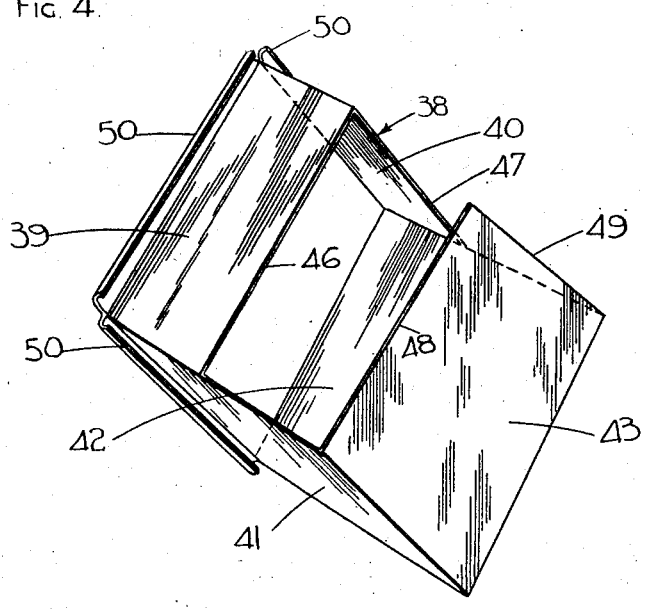
Figure 6 is a perspective view of the baffle device shown in Figures 1 to 3.

One construction of baffle device as shown more particularly in Figure 6, is constituted by a hollow member generally indicated at 38 of square cross section comprising upper surfaces 39, 40, lower surfaces 41, 42, and a baffle plate 43 at its inner end. The member 38 is supported in the air inlet passage as shown in Figure 1, with its longitudinal centre line parallel to but offset below the axis of the fan 13, by means of a plate 44 secured by bolts 45 to the hull 10, the said plate 44 having a square aperture therein corresponding with the cross section of the member 38 and being arranged with one of its diagonals in a vertical position. The upper part of the member 38 is cut away as shown, the edges 46, 47 of the upper surfaces 39, 40, lying in the plane of the plate 44 when the member 38 is in position therein. The upper edges 48, 49 of the baffle plate 43 preferably meet at an angle of slightly more than 90°, and the rear or outer edges 50 of the member 38 are turned over as shown.

The weatherproof cowl 53 (Figures 1 and 2), which may be made of 12 gauge mild steel, is spaced from the plate 44 by spacing members 54 on the bolts 45, thus providing an annular inlet to the air passage. This inlet may be covered if desired by a ¾" mesh wire guard or grid (not shown).

The direction of the air drawn into the compartment is shown by the arrows in Figure 1. Any moisture which finds its way through the cutaway upper part of the baffle device and past the baffle plate 43 to the front or inner surface of the supporting plate 44 can escape through an elbow-shaped drainpipe 55 at the bottom of the annular inlet. The fan may of course be arranged to pass air through the duct 14 in either direction.

A dished phosphor bronze mosquito net or gauze 56 of 16 mesh may be mounted as shown between the fan 13 and the baffle plate 43. The gauze 56 is located by means of a flange 58 at the inner end of a tubular shroud or lining 57, the said flange 58 being secured between the frame 29 and the plate 30. The shroud or lining 57 which is of circular cross section fits within the casing 37 of the air inlet passage and is welded to the plate 44 so as to surround the front cutaway part of the baffle member 38. The mosquito net may be reached by removing the frame 29 from the plate 30.

In the modified construction shown in Figures 4 and 5, the electric motor 12, the electrical connections of which are not shown, is supported at three points 15 as before in an air duct 59 which contains a fan 13 and converges slightly towards its outlet or front end 32 so as to give greater velocity to the air stream produced by the fan. Said duct is secured within a part-spherical member 60 which is rotatable in any desired direction within a part-spherical socket comprising two flanged parts 61 and 62 adapted to be bolted together by bolts 63 so that the flanges 64 and 65 of the said parts 61, 62 form a peripheral groove in which a supporting frame, such as the frame 22 previously described, can be clamped between rubber washers 24, 25, as before. This construction may be used in conjunction with the air inlet passage of a ship's cabin containing baffle means, as described with reference to Figures 1 to 3.

It will be appreciated that in each of the constructions described above the air duct carrying the fan may be turned so as to be in line with the air passage, in which position rotation of the fan serves to draw air into the compartment or expel it therefrom. Alternatively the said duct may be turned so as to be more or less displaced out of line with said passage and face in any desired direction, the fan then being used either to draw air into the compartment or expel it therefrom and at the same time circulate the air in the compartment, or to circulate the air only. The fan and duct may of course be used otherwise than adjacent an air inlet opening in a cabin wall.

Various modifications of the constructions described above may be made. For example, the opening in the ship's hull may be disposed out of line with the opening in the cabin lining to accommodate an air passage casing having a double or S bend therein. In this construction a mosquito net may be slidably fitted within the said passage and the air duct may be slidably mounted relative to said passage to facilitate insertion and removal of the net. Splitter vanes may of course be provided in the air passage.

The baffle device may also be modified. For example, a cylindrical member having an outwardly flared inner end may be supported in the air passage by an annular plate secured to the ship's hull, with said flared end adjacent a deflector device carried in a cylindrical extension from the plate supporting the cylindrical member. This deflector may comprise two frusto-conical deflector elements coaxially arranged one inside of the other, the outer one being secured to the interior surface of the said tubular extension, and a central conical deflector element within the inner frusto-conical element.

What we claim is:

1. A system for ventilating the interior of a ship, comprising an aperture through the ship's hull and lining, weatherproof means mounted exterior to the ship's hull, adjacent to, and extending over the mouth of said aperture to obstruct ingress of water therethrough, an air duct, a rotary fan mounted in said air duct with its axis co-directional with the duct axis, and supporting means for attaching said duct to, and internally of, the ship's lining adjacent said aperture to receive a flow of air therefrom, said supporting means comprising a plurality of elements of which one element is a collar secured to the ship's lining, a second element which carries said duct, and means mounting said elements for rotation and relative adjustment about selected axes within wide conical angular limits.

2. A system for ventilating the interior of a ship, comprising an aperture through the ship's hull and lining, weatherproof means mounted exterior to the ship's hull, adjacent to, and extending over the mouth of said aperture to obstruct ingress of water therethrough, an air duct, a rotary fan mounted in said air duct with its axis co-directional with the duct axis, supporting means for attaching said duct to, and internally of, the ship's lining adjacent to said aperture to receive a flow of air therefrom, said supporting means comprising an element mounted in guide means secured to the ship's lining, allowing it to be adjusted by rotation in a plane substantially parallel to the adjacent interior surface of the ship's hull, and another element carrying said air duct, hinged to the first-mentioned element and adjustable by rotation on its hinge about an axis lying in or parallel to the plane of rotation of the first-mentioned member, whereby the direction of the air duct axis may be adjusted, within limits, as desired.

3. A system for ventilating the interior of a ship, comprising an aperture through the ship's hull and lining, weatherproof means mounted exterior to the ship's hull, adjacent to, and extending over the mouth of said aperture to obstruct ingress of water therethrough, an air duct, a rotary fan mounted in said air duct with its axis co-directional with the duct axis, supporting means for attaching said duct to and internally of the ship's lining adjacent to said aperture to receive a flow of air therefrom, said supporting means comprising a part-spherical member carrying said air duct, and a socket member, secured to the ship's lining, in which said part-spherical member is accommodated for rotation about any axis passing through the center of said part-spherical member, whereby universal adjustment of the air duct axis to any desired direction within wide angular limits is available.

4. A ship ventilating system according to claim 2, wherein said air duct is encircled and carried by a frame which is hinged to an annular plate mounted for rotation in its own plane, in fixed guide means secured on the interior surface of the ship's lining around the aperture therethrough, said air duct projecting inwardly from the plane of said annular plate.

5. A ship ventilating system according to claim 2, comprising releasable locking means extending between said hinged elements whereby said elements may be secured in any desired position of relative adjustment about their hinge.

6. In a system for ventilating the interior of a ship by way of a passage through the ship's walls, an air duct, a fan mounted in said air duct with its axis co-directional with the duct axis, and supporting means for attaching said air duct to the interior of the ship's walls in a position adjacent to said passage so that the duct receives a flow of air from the passage, said supporting means comprising two elements hinged together, one being mounted in a fixed circular guide on the ship's wall for rotation therein in a plane substantially parallel to the adjacent area of the ship's wall, and the other carrying said air duct firmly secured therein.

JOSEPH CUTHBERT AKESTER.
THOMAS WYLIE.

REFERENCES CITED

The following references are of record in the file of this patent:

UNITED STATES PATENTS

| Number | Name | Date |
|---|---|---|
| 739,438 | McConnell | Sept. 22, 1903 |
| 791,397 | Asbury | May 30, 1905 |
| 1,011,799 | Inglis | Dec. 12, 1911 |
| 1,270,613 | Gustavson | June 25, 1918 |
| 1,341,405 | Woodward | May 25, 1920 |
| 1,886,313 | Stewart | Nov. 1, 1932 |
| 1,930,794 | Freeman | Oct. 17, 1933 |
| 2,010,808 | Braine | Aug. 13, 1935 |
| 2,048,985 | Akester | July 28, 1936 |
| 2,157,609 | Hopkins | May 9, 1939 |
| 2,190,945 | Guth | Feb. 20, 1940 |
| 2,265,317 | Schlirf | Dec. 9, 1941 |
| 2,348,886 | Dodgson | May 16, 1944 |
| 2,354,795 | Castle | Aug. 1, 1944 |
| 2,400,702 | Messinger et al. | May 21, 1946 |
| 2,400,880 | Hoppmann Jr. et al. | May 28, 1946 |
| 2,418,760 | Cucci | Apr. 8, 1947 |

FOREIGN PATENTS

| Number | Country | Date |
|---|---|---|
| 39,943 | Denmark | Mar. 9, 1929 |
| 93,817 | Austria | Mar. 15, 1923 |
| 501,402 | Great Britain | Feb. 23, 1939 |